United States Patent [19]

Geurtsen et al.

[11] 4,383,880

[45] May 17, 1983

[54] WEB TRANSPORT SYSTEM WITH ELECTRO-OPTICAL LABEL DETECTION

[75] Inventors: Friedrich H. H. Geurtsen, Holliston, Mass.; Waldemar S. Kebbel, Bremen; Manfred Meyer, Stuhr, both of Fed. Rep. of Germany

[73] Assignee: Dennison Manufacturing Company, Framingham, Mass.

[21] Appl. No.: 329,834

[22] Filed: Dec. 11, 1981

[51] Int. Cl.³ .............................................. B32B 31/00

[52] U.S. Cl. .................................. 156/361; 156/542; 226/33; 226/45

[58] Field of Search .............................. 156/361-363, 156/542, 541, 351; 226/8, 24, 27, 37, 45, 33

[56] References Cited

U.S. PATENT DOCUMENTS

| | | | |
|---|---|---|---|
| 4,019,935 | 4/1977 | Harvey | 156/361 X |
| 4,214,937 | 7/1980 | Geurtsen et al. | 156/361 |
| 4,248,655 | 2/1981 | Kerwin | 156/361 X |
| 4,315,795 | 2/1982 | Jodrey et al. | 156/361 X |

*Primary Examiner*—David A. Simmons
*Attorney, Agent, or Firm*—George E. Kersey; Arthur B. Moore; Barry D. Josephs

[57] ABSTRACT

A label carrier web transport for use in heat transfer decorators and the like, in which labels are optically registered to control web transport. A timing assembly coordinates the rotation of a cam shaft with the actuation and deactuation of clutch and brake assemblies within a metering roll. An optical scanner trained on the web registers a predetermined contrast location to actuate the brake and deactuate the clutch, subject to the presence of an enabling signal from the timing assembly. The metering roll, in combination with a reciprocating label shuttle, provides intermittent web motion to achieve controlled label advance. An alternative label transport system incorporates a capstan web drive in lieu of the metering roll, with a microprocessor to control various machine functions including intermittent web transport.

10 Claims, 9 Drawing Figures

WEB TRANSPORT SYSTEM WITH ELECTRO-OPTICAL LABEL DETECTION

BACKGROUND OF THE INVENTION

The present invention relates to web transport systems, and more particularly to web transport systems in heat transfer decorators.

One particularly successful type of heat transfer decorator utilizes a label carrier web which is transported past a label preheater to a decorating site, where it is heated and pressed against an article surface to transfer a heat releaseable label onto the article. Illustrative U.S. patents include: U.S. Pat. Nos. 2,981,432; 3,064,714; 3,079,979, 3,193,211; 3,208,897; 3,231,448; U.S. Pat. No. Re.26,226; and U.S. Pat. No. 3,483,063. In designing a suitable web transport for such decorators, it is desirable that the linear motion of the web at the decorating site match the linear velocity of the article, that the labels are properly registered with the article surface during decoration, and additionally that the web be maintained at a suitable tension throughout its length.

As illustrated for example in FIG. 2 of U.S. Pat. No. 3,079,979, the label carrier web employed in these prior art decorators comprises a label bearing portion on which labels are periodically spaced, and a margin for evenly spaced pin holes. The label carrier web is fed from an unwind roll through a series of dancer and idler rolls to a metering roll, and thence past a preheater through the decorating site, further dancer and idler rolls to a rewind roll. The metering roll includes a peripheral series of pins which engage the pin holes of the web to register the speed of the web and thereby control the average web speed. Shuttle rolls are mounted astride the label transfer site on a reciprocating label shuttle, which accelerates the local web speed when extending, and decelerates the web speed when retracting. This permits a closer spacing of labels on the carrier web. The web is pulled through the various transport stations by the takeup reel, which rotates at a surface speed matching that of the metering roll. Clutch and brake assemblies at both the unwind and takeup reels, together with dancer rolls, provide torque adjustments for the reels to regulate web tension.

This prior art web transport system has proven quite satisfactory in operation, but encounters certain disadvantages attributable to the use of pin holes to register the web at the metering roll. There are economic costs associated with the punching of these holes and the additional paper needed for the pin hole margin. The need for a substantial margin to include the pin holes has the additional disadvantage that during decoration the label bearing portion of the web will be pressed against the article where this margin may offer mechanical interference. A typically encountered problem in the transport of such webs is the fraying of the edges of the pin holes, which may lead to web breakage as well as nonuniform rewind of the web. It is advantageous therefore to provide an alternative web registration system, eliminating the need for these pin holes.

One such system disclosed in U.S. Pat. No. 4,019,935 and other prior art patents, utilizes a series of indices or registration marks which are imprinted on the label web at a spacing matching the label pitch. A photoelectric detector placed adjacent the web path detectes these marks and provides periodic output signals corresponding to the label pitch. It is necessary to provide a suitable location for the registration marks remote from the labels to avoid spurious signals attributable to the label. Typically, therefore such marks are imprinted on a web margin, necessitating a larger carrier web area. thus, while these systems avoid certain of the difficulties associated with pin-feed web transports, they still suffer the problems associated with an additional web margin.

Accordingly, it is a primary object of the invention to provide an improved web transport system for use in heat transfer decorators. A related object is to design a system of this nature which precisely regulates web speed at the decorating site.

Another object of the invention is to avoid the disadvantages of a mechanical web registration system employing pin holes in the web. Specifically, it is desirable to reduce the economic costs associated with such pin holes, as well as the technical problems in transporting a web of this type.

A further object of the invention is to employ a web registration system which does not require extraneous register marks on the carrier web. It is particularly desirable to provide a carrier web of reduced area, having no substantial margin beyond the label-bearing portion.

SUMMARY OF THE INVENTION

The above and additional objects are implemented in the improved web transport system of the invention, which is especially suited to regulating the advance of a label carrier web in a heat transfer decorator. The improved transport system is characterized by the optical detection of a contrast location which is typically part of a printed label, thereby generating a signal to control intermittent web advance.

In accordance with one aspect of the invention, an optical scanner assembly, in conjunction with the timing apparatus and control circuit, generates a "window" on the web, i.e. a predetermined detection interval only during which the system responds to an optical contrast in the web. Advantageously, the window is located by the user at a point of high optical contrast within a label. Preferred apparatus for this purpose includes a web support plate with tension rolls, and an optical scanner which is adjustably located both horizontally and vertically. Such a system avoids the disadvantages of mechanical web registration, as well as the need for extraneous web registration marks on the web.

In accordance with another aspect of the invention the electronic control circuit comprises a NAND gate array together with a power source to ensure the proper sequence of machine operation. The control assembly prevents simultaneous energizing of brake and clutch, and enables the scanner to actuate the brake. In the preferred embodiment, a series of LEDs register the operation of the brake, clutch, enabling circuit, and optical scanner.

The principal elements in the preferred embodiment are a metering roll with a clutch and brake assembly which achieves intermittent web advance at a controlled velocity; an optical scanner assembly to generate a signal responsive to an optical contrast in the label area of the carrier web; a label shuttle/heart cam assembly to provide local variation of web advance in the label transfer area; timing apparatus to provide a control signal to the metering roll, clutch, and brake in accordance with the rotation of the heart cam; and an electronic control circuit to coordinate the operation of these various transport control assemblies.

In accordance with another aspect of the preferred embodiment, the metering roll incorporates internal clutch and brake assemblies to regulate the rotation of a metering roll drum relative to its central shaft. In the preferred version, these assemblies are electromagnetically actuated, with an adjustable magnetic gap to calibrate the clutch and brake operation.

In accordance with yet another aspect of the preferred embodiment, the timing assembly includes a pair of pins appended to the heart cam shaft at adjustable angular positions. Each of these pins actuates a proximity switch which in turn initiates a signal to the electronic control circuit. The timing assembly advantageously further includes a pair of stop members which may be utilized to adjust the angular position of the pins on the heart cam shaft, thereby calibrating the operation of the metering roll, clutch, and brake assemblies to that of the label shuttle assembly.

The sequence of operation of the web transport apparatus in the preferred embodiment involves the following steps: the timing assembly energizes the clutch and de-energizes the brake, allowing the metering roll drum to rotate around its axis and feed the label web through the decorator at an increased velocity. This places the control circuit in a Disable mode, during which an entire label can pass through the scanner without effect. When the control circuit is converted to an Enable mode by the timing apparatus, the passage of a label contrast area through the scanner "window" will energize the brake and de-energize the clutch, stopping the metering roll rotation. The transport apparatus will remain in this condition until the timing apparatus generates a signal placing the control circuit in the Disable mode, reenergizing the clutch.

In an alternative embodiment of the invention, a capstan web drive located downstream of the decorating station pulls the web through the decorator. This embodiment omits the metering roll and label shuttle, and provides intermittent web advance by means of clutch and brake assemblies within the capstan. The article-holding turret is preferably directly driven from the capstan drive shaft, thereby coordinating web advance with the rotation of articles to be decorated.

In an advantageous version of this alternative embodiment, the function served by the timing assembly of the preferred embodiment is effected by a microprocessor which provides a timing signal to the control circuit. The microprocessor is programmed with the desired web speed, label pitch, and window location. A pnuematic dancer roll assembly upstream of the decorating site provides label feed at a controlled pitch and tension, regulated by the microprocessor.

BRIEF DESCRIPTION OF THE DRAWINGS

The above and additional aspects of the invention are illustrated with reference to the detailed description which follows, taken in conjunction with the drawings in which.

and

Figure 8:
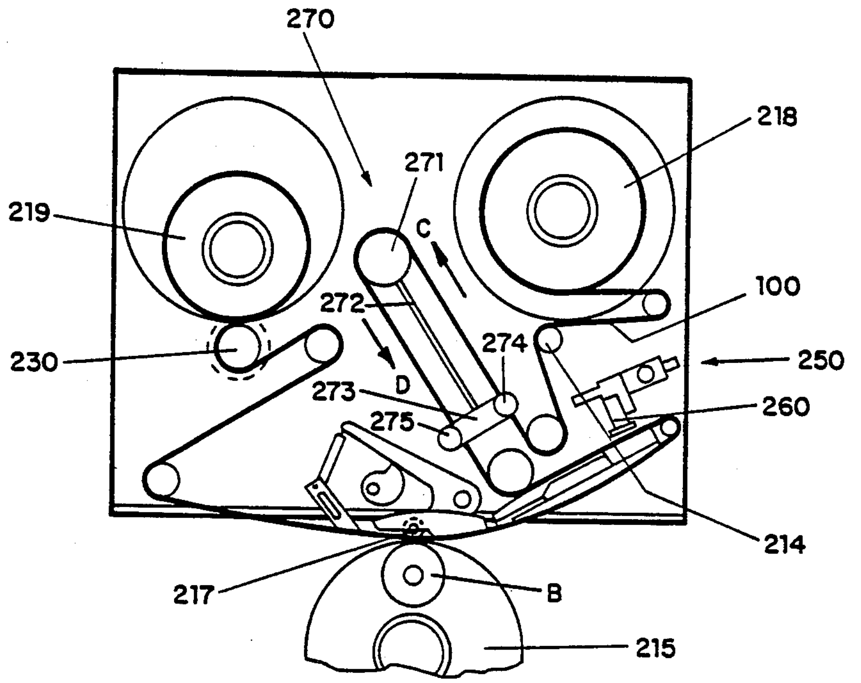
FIG. 8 is a plan view of a heat transfer decorator in accordance with an alternative embodiment of the invention.
Figure 9:
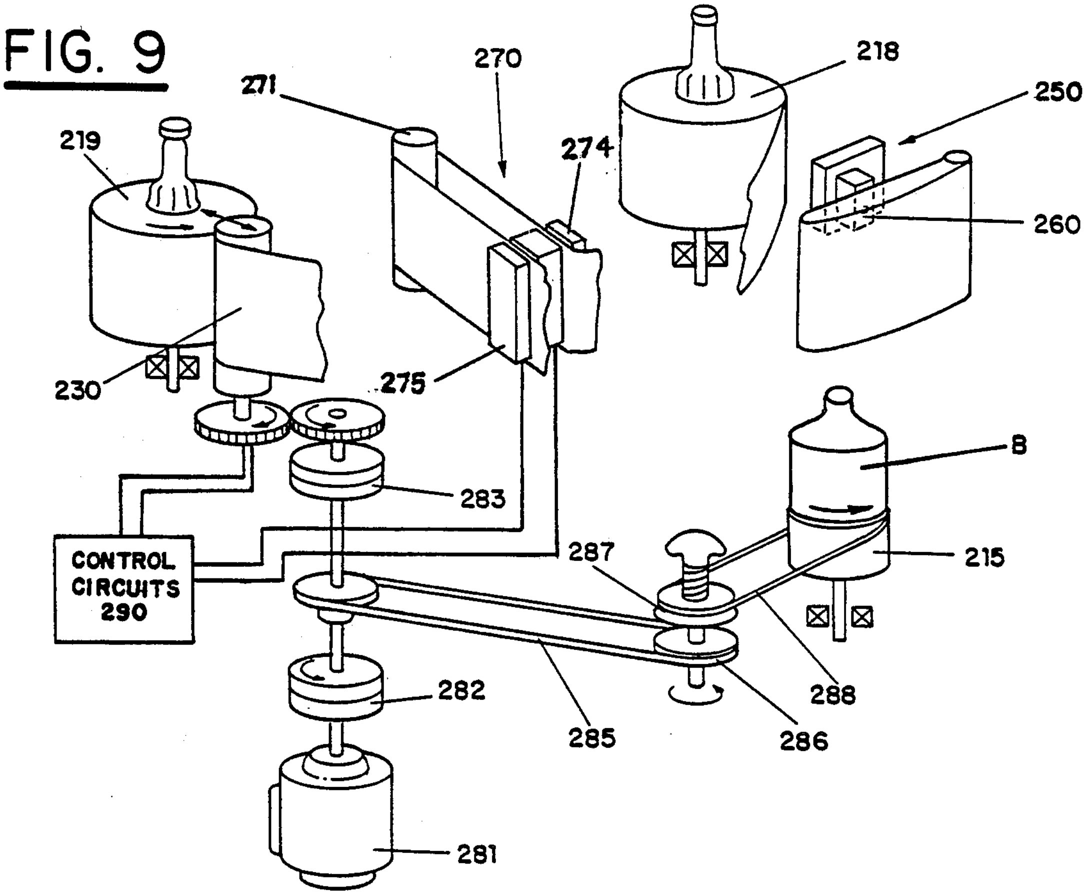

FIG. 9 is a partial schematic view of drive and label transport control mechanisms for the decorator of FIG. 8.

DETAILED DESCRIPTION

In the preferred embodiment illustrated in FIGS. 1–7, a heat transfer decorator of the general type disclosed in above-listed U.S. Patents incorporates a label carrier web transport in accordance with the invention. As shown in the plan view of FIG. 1, decorator 10 includes a web transport 11 for routing a carrier web 100 bearing labels 110 (FIG. 5) from an unwind reel 18, through various transport control and label processing stations, to a takeup reel 19. The principal elements of the carrier web transport control are a metering roll 30, a label scanner assembly 50, a shuttle 20 with shuttle rolls 21 and 22, and tension control devices **18*a* and 19*a* associated with the unwind and takeup reels. A label preheater 14 and a transfer roll 17 preheat labels 110 and transfer them to articles using heat and pressure. A bottle or other article B is carried by turret 15 into proximity with carrier web 100, and transfer roll 17** impresses the heated label against the bottle thereby achieving label transfer.

In the carrier web transport of the invention, the metering roll 30 in conjunction with label shuttle 20 provides an intermittent web motion at the decoration site. Thus, the web is advanced at a predetermined speed during decoration, but stops or retracts during interim periods. This allows a close spacing of labels 110 on carrier web 100 (cf. FIG. 5). As discussed in detail below, this intermittent web motion is regulated by a signal from scanner assembly 50, which registers a selected contrast location on web 100, typically part of a label 110. This control signal actuates and deactuates clutch and brake assemblies within metering roll 30 as moderated by a master timing mechanism located on the shaft of heart cam 24 (shown in phantom) to coordinate the web transport with other machine functions. Shuttle rolls 21 and 22 are mounted on shuttle 20, which is reciprocated by label shuttle slide 23 and carriage 25 in response to the rotation of heart cam 24. A cam follower 26 (FIG. 2) imparts a proportional part of the reciprocating motion of carriage 25 to label shuttle slide 20. Similar mechanisms control the motion of turret 15. An angle scale 27 tracks the angular orientation of heart cam 24; while angle scale 28 tracks the movement of the label shuttle slide 23 as well as turret shuttle slide.

Figure 2:
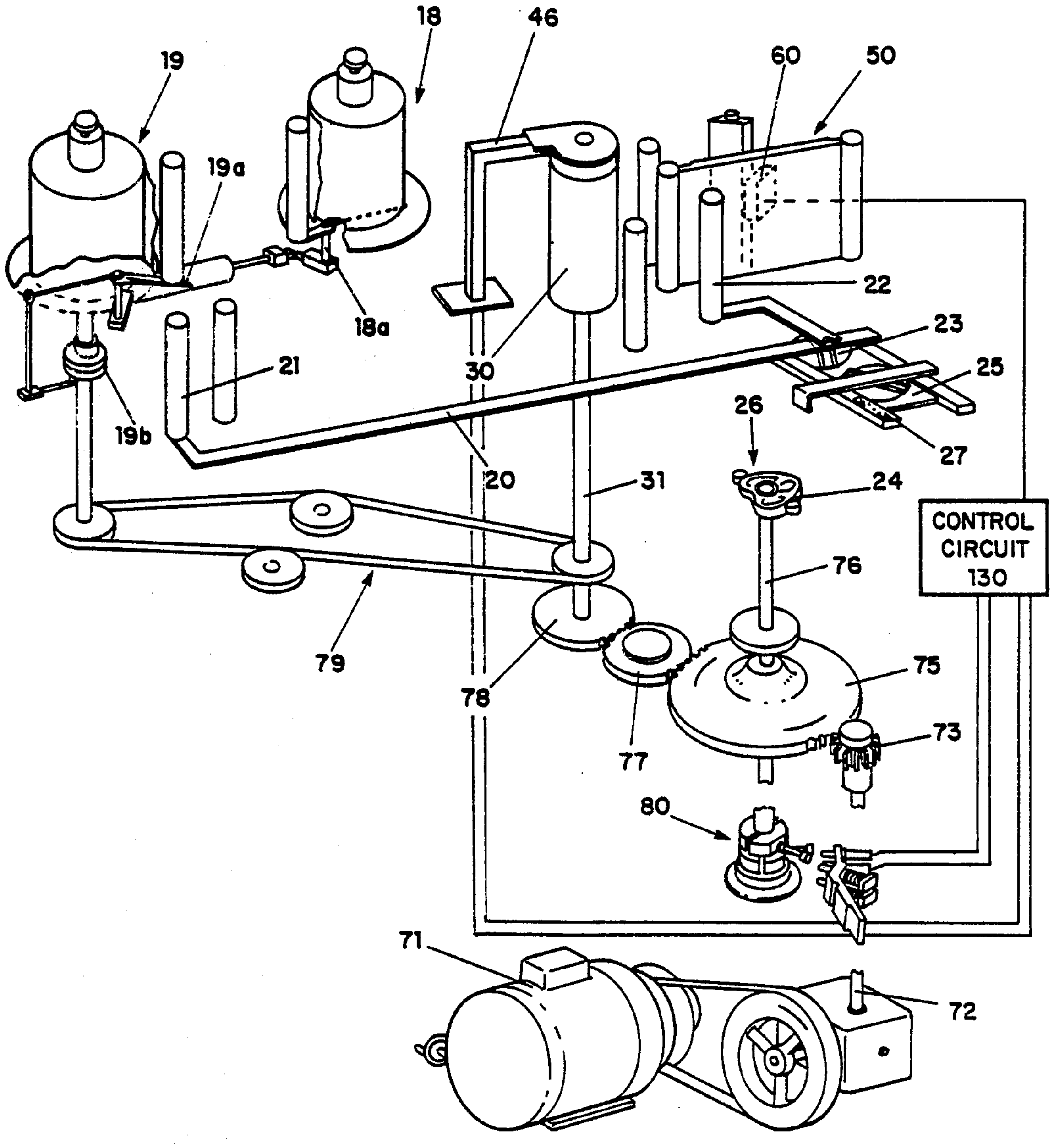
FIG. 2 is a partial schematic view of drive and label transport control mechanisms for the decorator of FIG. 1.

FIG. 2 is a schematic view of various drive components of decorator 10 (in particular components for transporting carrier web 100), as well as associated control apparatus. Drive shaft 72 is driven from motor 71 to provide the basic mechanical input for decorator 10. These mechanisms induce the rotation of the metering roll shaft 31 via gear 73, heart cam gear 75, and gears **76, 77, 78*a*, and 78*b*. Rewind roll 19 is driven from the metering roll shaft 31 by chain 79**. The takeup reel 19 includes a tension control assembly 19*a* to control its rotation via clutch 19*b*; a similar tension control assembly 18*a* located at the unwind reel 18 regulates a brake (not shown). Preferred tension control apparatus of this type is disclosed in U.S. Pat. No. 3,193,211.

Figure 4:
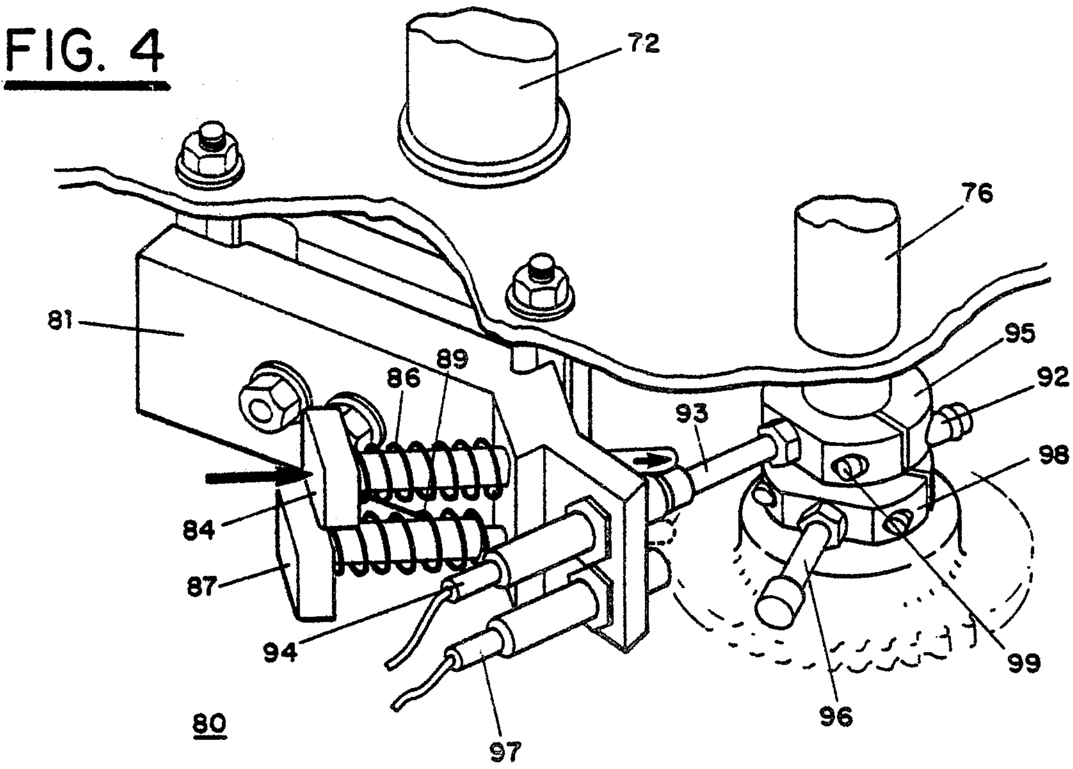
FIG. 4 is a perspective view of a preferred timing assembly as shown generally in FIG. 2.

Heart cam 24 at the top of heart cam shaft 76 regulates the reciprocation of shuttle 20 as discussed above. The heart cam shaft controls the intermittent rotation of metering roll 30 primarily via a timing device assembly 80 located on the heart cam shaft 76. A preferred design of the timing assembly 80 is illustrated in FIG. 4, discussed below. The heart cam rotation provides a basic timing input to the other moving parts of decorator 10 via mechanisms not shown.

Scanner support assembly 50, located immediately upstream of metering roll 30, provides an additional control signal for regulating the intermittent metering roll motion. A preferred design of scanner assembly 50 is disclosed below with reference to FIG. 5. A control circuit 130 coordinates the signals from scanner support assembly 50 and timing assembly 80 to provide actuating and deactuating signals to clutch and brake assemblies within the metering roll 30.

Figure 3:
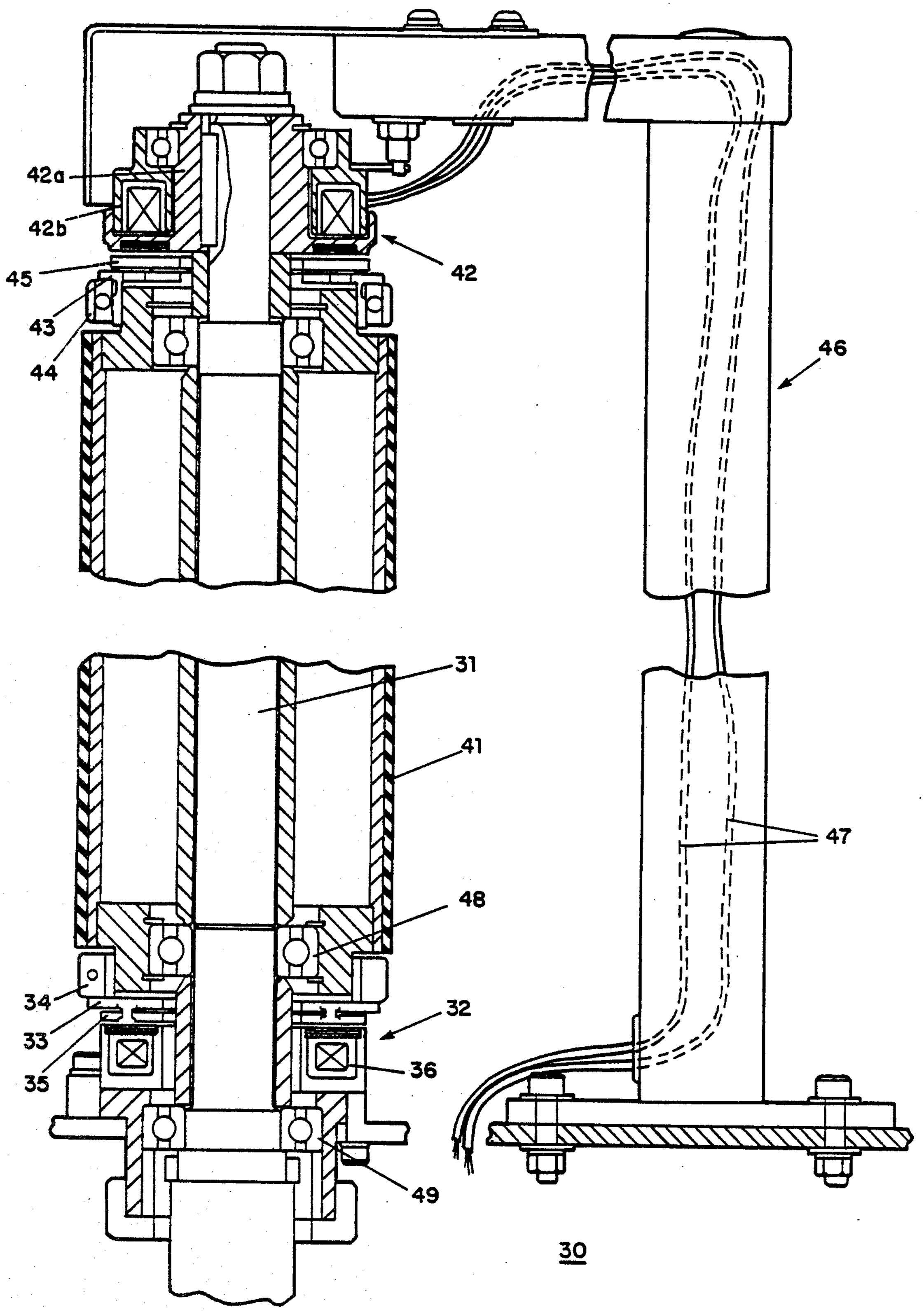
FIG. 3 is a partial sectional view of an illustrative metering roll for the decorator of FIG. 1.

FIG. 3 gives a partial sectional view of a preferred design of metering roll 30. Metering roll 30 comprises a metering roll shell 41 mounted circumjacent metering roll shaft 31 in bearings 48. Metering roll 30 includes an internal electromagnetic brake assembly 32 at its base, and an electromagnetic clutch 42 at top. In brake assembly 32 the actuation of solenoid 36 pulls in the armature plate 35, attached by a leaf spring to clamp plate 33. Clamp plate 33 in turn is fixed to metering roll shell 41 by clamp collar 34. The release of armature plate 35 therefore allows metering roll shell 41 to rotate relative to shaft 31. The actuation of clutch solenoid 42*b* pulls in armature plate 45, thereby accelerating and rotating the metering roll shell 41 via clamp plate 43. Each of the clutch and brake armature plates are separated from the corresponding solenoid by a magnetic gap, which may be adjusted by loosening, shifting and tightening the respective clamp collar 34 or 44 on its clamp plate. Metering roll shaft 31 rotates continuously with the inner portion 42*a* of clutch 42. The stationary coil 42*b* of clutch 42 is prevented from rotation by a screw in an antirotation bracket 46. Electronic control signals for the clutch assemblies are routed through wires 47*a* passing through antirotation bracket 46, while the brake assembly receives control signals through wires 47*b*.

Figure 1:
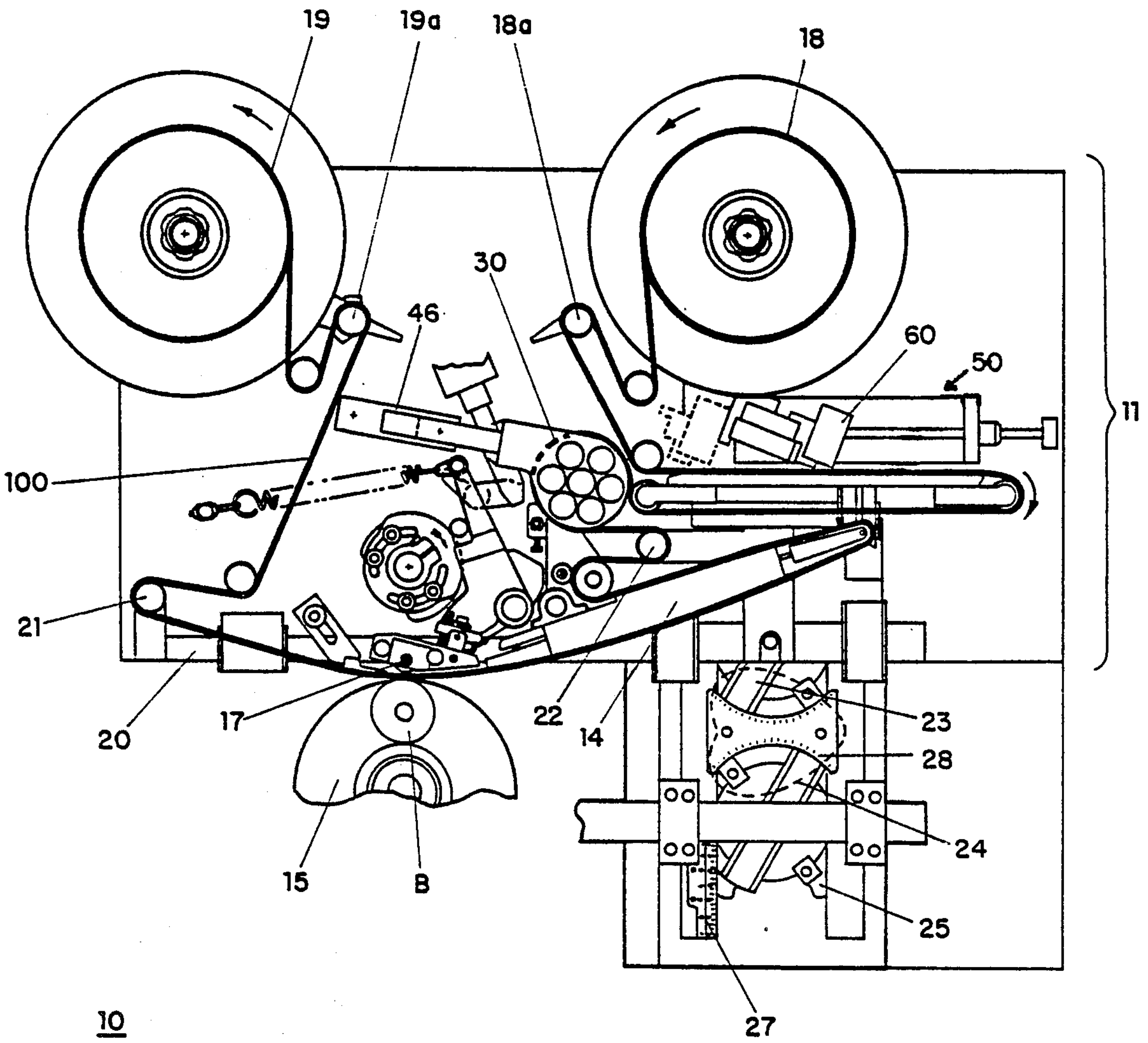
FIG. 1 is a plan view of a heat transfer decorator in accordance with the preferred embodiment.

FIG. 4 gives a perspective view of a preferred design for timing assembly 80. Bracket 81 is bolted to the superstructure of decorator 10 adjacent the drive shaft 72. Bracket 81 houses a pair of proximity switches 94 ("clutch") and 97 ("enabler"), each of which outputs a signal on the approach of one of the pins 93 and 96 protruding from heart cam shaft 76. Each of pins 93 and 96 are housed in a split collar, respectively 95 and 98. The split collars may be tightened or loosened by the user to provide a prescribed friction, illustratively via adjustment bolts 92 which squeeze belleville disc springs. Set screws 99 prevent overtightening of collars 95, 98. The tension should be chosen so as to prevent disruption due to machine vibration, while allowing the operation of the stop mechanisms explained below. Stops 84 and 87 are mounted to bracket 81 with an outward bias due to the respective compression springs 86 and 89. To adjust the angular position of one of the pins 93 and 96 on the heart cam shaft 76, the corresponding stop is pushed inwardly by the user while jogging the machine to cause rotation of shaft 76. The machine should be jogged up to one full cycle in order to rotate the respective pin to contact its stop, and thereafter until the end of the shuttle carriage 25 is aligned with a predetermined angular indication on angle scale 27 (FIG. 1).

Figure 5:
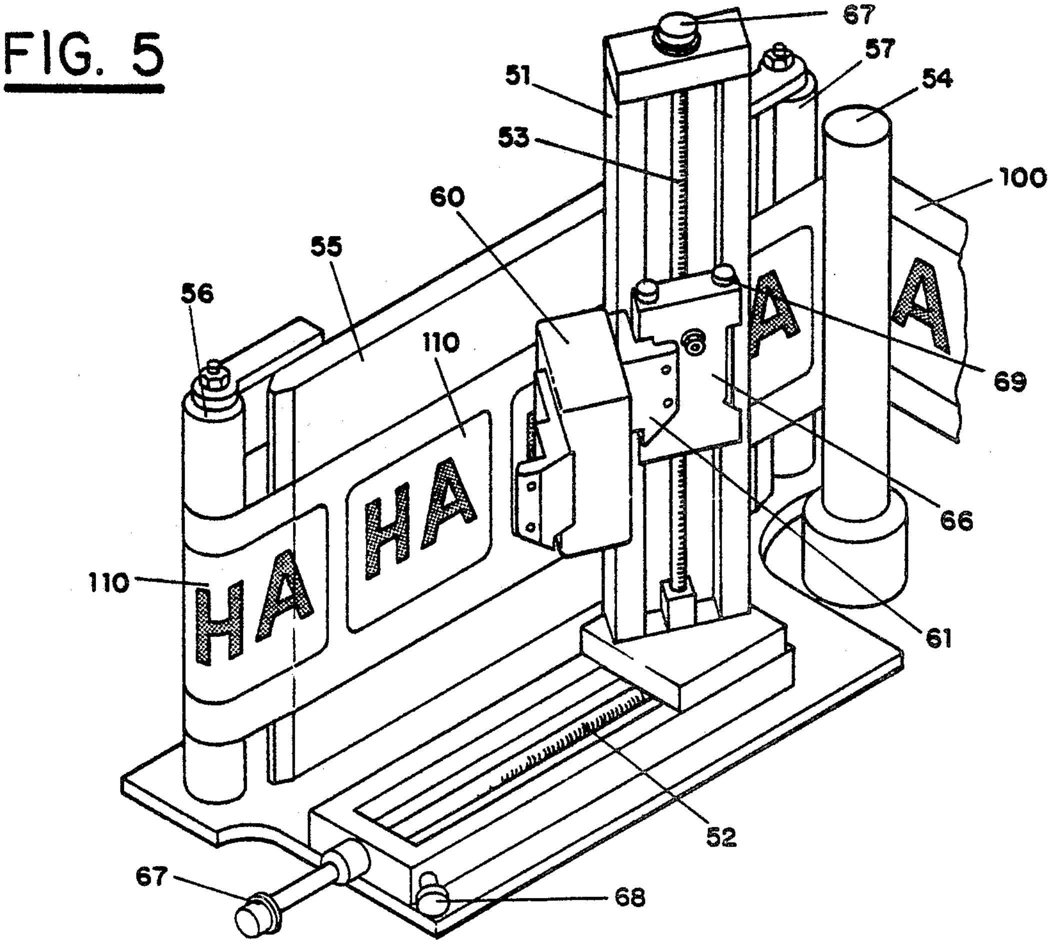
FIG. 5 is a perspective view of a scanner and scanner support assembly in accordance with the preferred embodiment.

FIG. 5 gives a perspective view of an illustrative scanner support assembly 50 to be employed for the optical detection of labels in accordance with the invention. Carrier web 100 passes around idler roll 54 and thence between tension rolls 56 and 57, which maintain the web flat against a vertical support plate 55. Scanner 60 is mounted to a bracket 66 which is carried on a support tower 51. Support tower 51 advantageously includes a vertical track 53 to permit adjustment of the height of carriage 66 and scanner 60. Scanner 60 with mounts 61 may be mounted on either side of carriage 66 and tightened with thumb screws 69 in order to widen the range of reading locations. Scanner 60 may be adjustably mounted at a desired distance from plate 55. Support tower 51 in turn is slideably mounted in a horizontal track 52, to which it is secured in order to provide a desired horizontal reading location. Horizontal and vertical tracks 52 and 53 illustratively comprise V-groove slides, each driven by a screw with a knob 67. Thumb screws 68 stabilize the mount within tracks 52 and 53. Support plate 55 keeps the paper web flat at a proper distance from the lens of scanner 60. Plate 55 advantageously comprises a metallic plate with a black anodized surface to prevent unwanted reflection of light passing through the paper. Scanner 60 is preferably slanted from a perpendicular to support plate 55 in order to prevent sensing reflections from the surface of web 100. The scanner may be equipped with an internal light source, a sensitivity adjustment, and a control to select the capability of registering dark/light and light/dark optical transitions. Electro-optical apparatus having sensitivity to other wavelengths such as ultraviolet, or providing chromatic reading capabilities, may be employed in lieu of the illustrated black/white scanner 60.

Figure 6:
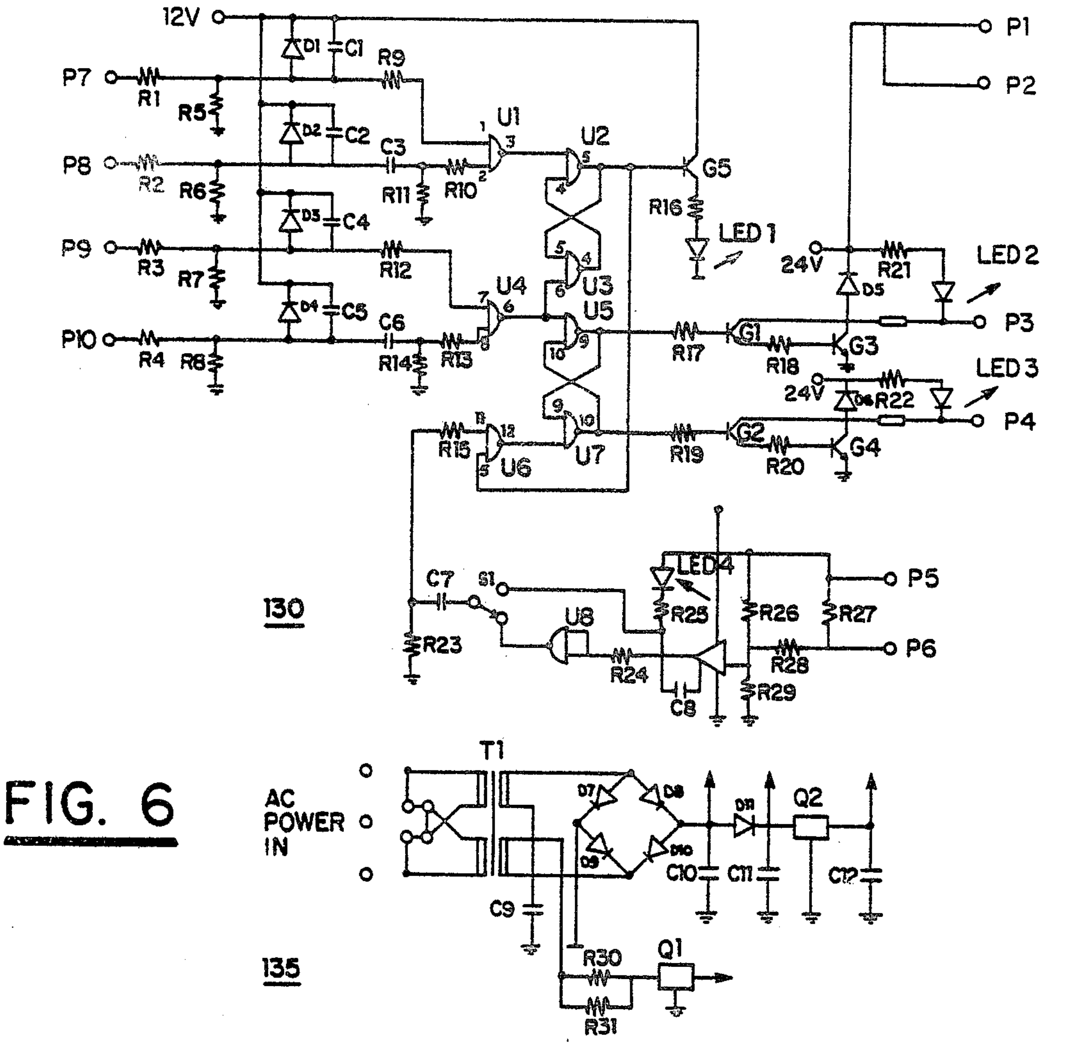
FIG. 6 is a circuit schematic diagram of a web transport control circuit for the decorator of FIG. 1.

FIG. 6 is a schematic diagram of an electronic circuit 130 for processing the signals from proximity switches 94 and 97, and from scanner 60, in order to output actuating and deactuating signals to the clutch and brake assemblies of the metering roll 30. Circuit 130 comprises a logic array of NAND gates to achieve the control sequence described below. Inputs P7 and P8 receive a signal from the clutch proximity switch 94 while inputs P9 and P10 receive the signal from the enabler proximity switch 97. Inputs P5 and P6 receive the output signal of the scanner 60. When the output 5 of gate U2 goes low a light emitting diode LED1 ("enabler") indicates an Enable state for the circuit. When the output 9 of gate U5 goes low, and therefore the output 10 of gate U7 goes high, transistors G1–G4 actuate the clutch via outputs P1 and P3 and deactuate the brake via outputs P2 and P4; in this state, LED2 ("clutch") indicates an activated state for the clutch. In the converse situation, with node 10 low and node 9 high, the clutch is deactuated and the brake actuated, LED2 turns off, and LED3 ("brake") turns on indicating actuation of the brake. Inputs P5 and P6 receive a low order amplitude positive or negative polarity signal from scanner 60, depending on whether the scanner is reading a transition from light to dark, or from dark to light. This signal is amplified by operational amplifier U9 and activates LED4 ("scanner"). Switch S1 enables the user to adjust the circuit for dark/light transitions versus light/dark transitions. Switch S1 may be omitted if scanner 60 provides this switching capability internally, as is desirable. A suitable scanner having these characteristics is sold by Visolux, of Berlin, Federal Republic of Germany. Output 12 of gate U6 goes low only when nodes 5 (Enable) and 11 are high. Circuit 135 outputs a rectified AC signal as a power supply to circuit 130.

Circuit 130 provides the following operational sequence. When the clutch proximity switch 94 is closed in timing assembly 80, circuit 130 energizes the clutch 42 and deenergizes the brake (Disable mode—node 5 high). In the situation in which the circuit remains in the Disable mode, an entire label 110 passes under scanner 60, switching output 11 on and off with no effect. After a prescribed time interval the lower "enabler" proximity switch is actuated, usually when the scanner is over a gap area between labels 110, causing circuit 130 to switch to Enable mode, and turning on LED1. In this state, the detection of an optical transition delivers a signal to inputs P5 and P6, which cause a low output of gate U6, thereby energizing the brake and de-energizing the clutch. The system will remain in this state until the clutch proximity switch 94 is tripped, energizing the clutch and starting a new cycle. Therefore, the metering roll shell 41 will rotate starting from the beginning of a cycle until both: (a) the enabler proximity switch 97 has been tripped and (b) the scanner 60 detects a label transition of a predetermined contrast. At this point, the metering roll shell 41 becomes stationary until the beginning of the next cycle.

Figure 7:
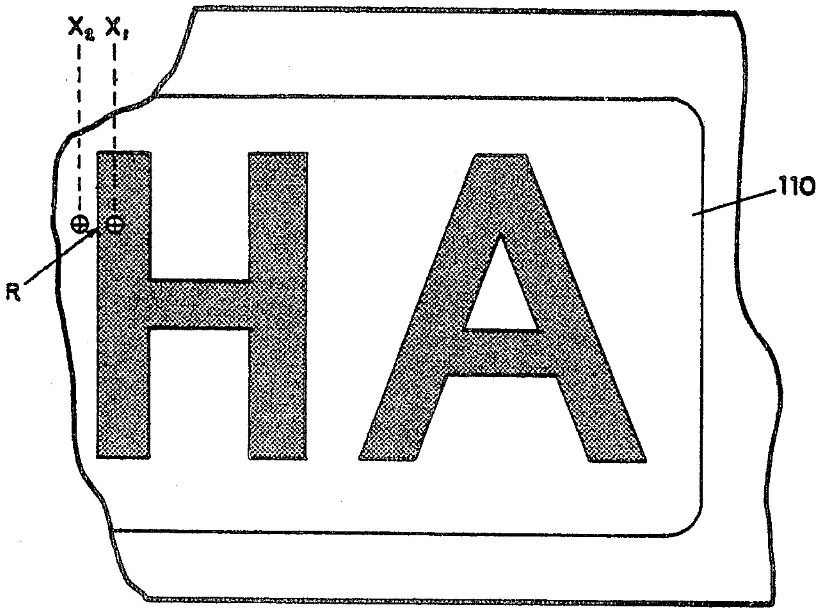
FIG. 7 is a partial schematic illustration of the optical registration of a label in the apparatus of FIG. 1.

In setting up the decorator 10, the user may choose the proper gears 78*a* and 78*b* (FIG. 2) to provide a desired angular velocity for metering roll shaft 31 although a proper gear ratio is not crucial in contrast to the prior art. The stroke of label shuttle 20 is calibrated by properly locating the angular position of the label shuttle slide 23. With reference to FIG. 4, the user presets the actuation angle of the clutch and brake proximity switches 94 and 97, as measured by the position of the shuttle carriage 25 on angle scale 27, using the technique discussed above. After threading web 100 and stabilizing the web level at a desired height, the metering roll should be rotated manually until a desired portion of a label is positioned at the labelling site. The scanner should then be vertically located at the height of a a suitable registration point—i.e. one having an area of high optical contrast. The scanner should be adjusted depending on whether there is a dark/light or light-/dark transition at the chosen registration point; in the former case, the preceeding dark or light area must be sufficiently broad. The user then horizontally positions the scanner 60 at a location just beyond the selected point. With reference to FIG. 7, for example, the user initially positions the scanner at X1 just beyond the registration point R. The user then determines the scanner sensitivity necessary to activate LED4 (FIG. 6). The user repeats this process at point X2 prior to registration point R, then adjusts the sensitivity of the average of the values thus determined.

To test the operation of the machine, the scanner should be located at the level of the registration point R (FIG. 7), and the machine cycled for several labels until the metering roll starts and stops, feeding one label at a time. If decorator 10 has been properly calibrated, the registration point R should stop within the area illuminated by scanner 60 when the machine is jogged slowly, and the decorator should consistently provide a start-stop web transport motion.

FIG. 8 shows in a plan view a heat transfer decorator 210 in accordance with an alternative embodiment of the invention. Decorator 210 is an improved version of the heat transfer decorator disclosed in U.S. Pat. No. 4,214,937. The principal elements of the web transport system 211 are an unwind reel 218; a pneumatic dancer roll assembly 270; label preheater 214 and transfer coil 217; a capstan web drive 230; and a takeup reel 219. Decorator 210 transfers labels 110 periodically spaced on a web 100 similarly to decorator 10 (FIG. 1), and controls the speed, tension, and intermittent advance of web 100 using the method and apparatus described below.

The metering roll 30 of decorator 10 is replaced in decorator 210 with a capstan 230 located adjacent takeup reel 219. Capstan 230 includes internal clutch and brake assemblies generally similar to those of the metering roll 30, and thus provides a stop and go feed of carrier web 100. With reference to the schematic view of FIG. 9, the shaft of the takeup reel of 219 is slideably mounted so as to permit a variable separation of the axes of takeup reel 219 and capstan 230. Takeup reel 219 is biased by air cylinder 276 so that the accumulated web roll will hug the capstan 30, providing a friction driven rewind of web 100. As further shown in FIG. 9, capstan 230 is mounted onto a shaft 284, which advantageously has a splined connection (not shown) to a DC motor 281, thus allowing a telescoping coupling for the label drive. Motor 281 drives shaft 284 by way of a label clutch 283, and is additionally connected to a turret clutch 282. Turret clutch 282 is linked by belt 285 to variable speed connection 286, which in turn controls the rotation of the turret 215 by means of a variable drive pulley 287 and connecting belt 288. Thus, the rate of advance of carrier web 100, pulled by capstan 230, is automatically coordinated with the rotation or articles B by turret 215.

With further reference to the plan view of FIG. 8, dancer roll assembly 270 provides an intermittent feed of a controlled length of carrier web 100, with a tension exerted by dancer roll 271. Dancer roll 271 is subjected to a bias within slot 272 in direction C, provided by air cylinder 240 (FIG. 9). The feed of carrier web 100 into and out of dancer roll assembly 270 is gated by pneumatic jaws 274 and 275. When jaw 274 is closed, and jaw 274 open, air cylinder 240 will cause dancer roll 271 to move to its extreme position in direction C, accumulating a reservoir of web 100. When jaw 275 closes and jaw 274 opens, the tension exerted by capstan 230 in direction D overcomes that of air cylinder 240, and pulls a length of web 100 out of dancer roll assembly 270. Tension control assembly 270 is coordinated with capstan 230 so that jaw 274 closes during the idle period of capstan 230, allowing the accumulation of a web surplus for the subsequent labelling cycle.

The intermittent operation of capstan 230 is modulated by a signal from scanner assembly 250, which may operate identically with scanner assembly 50 (FIG. 5). The feed of carrier web 100 is coordinated with other machine functions by means of a microprocessor 290, which provides a timing signal to actuate the deactuate clutch and brake assemblies within the capstan 230, and additionally provides control signals to open and close jaws 274 and 275. The sequence of operation substantially corresponds to that described above for decorator 10.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

We claim:

1. An improved label transfer machine characterized by periodic operation within labelling cycles, of the type including a web bearing a plurality of labels, means for routing the web through a transport path past a transfer site, and means for transferring labels onto articles at the transfer site, wherein the improvement comprises means for controlling the transport of the web comprising:

electro-optical registration means for generating a timing signal in response to a predetermined optical contrast within the labels;

means for periodically generating an enabling signal at a first point with each labelling cycle;

means for periodically generating a disabling signal at a second point with each labelling cycle;

means for initiating web motion in response to a given disabling signal; and means for halting web motion in response to a given timing signal, subsequent to an enabling signal but prior to the next disabling signal.

2. The improved label transfer machine of claim 1, wherein the timing signal is generated in response to the detection of a predetermined light to dark transition within a label.

3. The improved label transfer machine of claim 1, wherein the timing signal is generated in response to the detection of a predetermined dark to light transition within a label.

4. The improved label transfer machine of claim 1 wherein the routing means includes a capstan for intermittently pulling the web through the transport path at a controlled tension; and a rewind reel for collecting the web, frictionally driven by said capstan.

5. The improved label transfer machine of claim 4 further including drive means for rotating the capstan and for synchronously conveying articles through the labelling site.

6. The improved label transfer machine of claim 4 wherein the capstan is mounted on a rotating capstan drive shaft and includes internal clutch and brake assemblies, respectively to engage the capstan with its drive shaft and to halt the rotation of the capstan.

7. The improved label transfer machine of claim 6 wherein the capstan clutch is actuated by a given disabling signal, and wherein the capstan brake is actuated by a given timing signal subsequent to an enabling signal.

8. The improved label transfer machine of claim 4, further comprising label feed means located upstream of the labelling site for periodically accumulating a web surplus, and for periodically releasing the web surplus at a controlled tension.

9. The improved label transfer machine of claim 8, wherein the label feed means accumulates a web surplus in response to a given timing signal received subsequent to an enabling signal but prior to the next disabling signal, and releases the web surplus in response to the next disabling signal.

10. The improved label transfer machine of claim 1, further comprising a plurality of logic gates which receive said timing signal, enabling signal, and disabling signal, wherein said logic gates:

initiate an enabled state in response to an enabling signal, generate a start web signal and end any enabled state in response to a disabling signal, and generate a halt web signal in response to a timing signal during an enabled state.

* * * * *